UNITED STATES PATENT OFFICE.

ARTHUR ZITSCHER, OF OFFENBACH-ON-THE-MAIN, GERMANY, ASSIGNOR TO CORPORATION OF CHEMISCHE FABRIK GRIESHEIM-ELEKTRON, OF FRANKFORT-ON-THE-MAIN, GERMANY.

AZODYESTUFFS INSOLUBLE IN WATER AND PROCESS OF MAKING SAME.

No Drawing.   Application filed April 14, 1923.   Serial No. 632,136.

*To all whom it may concern:*

Be it known that I, ARTHUR ZITSCHER, a citizen of the German Empire, and resident of Offenbach-on-the-Main, Germany, have invented certain new and useful Improvements in Azodyestuffs Insoluble in Water and Processes of Making Same, of which the following is a specification.

My invention relates to azodyestuffs, insoluble in water, of the type:

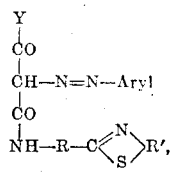

Y meaning a radicle of the hydrocarbon series, R and R' different or the same aromatic residues, which dyestuffs are when dry yellow to orange and brown powders, soluble in sulfuric acid to a yellow to olive solution. They can be obtained by combining a diazo- tetrazo- or diazoazo- compound not containing a sulfonic or carboxylic group with an acylacetylamino-arylthiazol body of the type:

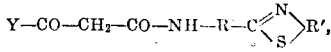

Y meaning a radicle of the hydrocarbon series, R and R' different or the same aromatic residues.

Under the term "radicle of the hydrocarbon series" I include aliphatic as well as aromatic radicles.

Azodyestuffs, derived from acylacetyl-aminoarylthiazol bodies of this kind, were not known hitherto. They can be used advantageously for the production of valuable pigment colors and can be produced also on the fiber by impregnating the goods with an alkaline solution of the thiazol body, squeezing them to remove excess liquid and developing with a diazocompound, in some cases without drying. The shades, thus obtained, are distinguished by a very good fastness, especially by an excellent fastness to washing.

As diazocomponents I may use in this process e. g. anilin, its homologues and substitution products, such as toluidins, anisidins, chloro-and nitroanilins, chloro- and nitrotoluidins, chloro- and nitroanisidins, naphthylamins, aminoanthraquinones, aminoazo bodies, diamino bases, such as dianisidin, dichlorobenzidin, diaminodiphenylurea and others.

The acylacetyl-aminoarylbenzothiazols, not known hitherto, can be obtained by heating aminoarylbenzothiazols with acylacetic acid esters.

The following examples illustrate the invention, the parts being by weight.

Example 1.

A diazo solution, prepared in the usual manner from 16.2 parts of 2.5-dichloro-anilin, is poured while stirring well into an aqueous suspension of 34 parts of aceto-acetyl-dehydrothiotoluidid, prepared by dissolving it in dilute caustic soda lye and precipitating with dilute acetic acid. The dyestuff is separated in yellow flakes, it is filtered, when the combination is complete, washed until neutral and advantageously used in the form of a paste. Mixed with the usual substrata it forms a yellow lake of a very good fastness.

Example 2.

Production of the dyestuffs on the fiber.

The yarn, well boiled and dried, is impregnated with a solution of 10 gr. of acetoacetyl-dehydrothiotoluidid, 15 c. c. of caustic soda lye of 34° Bé, and 20 c. c. of turkey red oil per liter, well wrung out and developed without drying in a diazo solution, to which sodium acetate has been added and containing 2.8 gr. of ortho-nitro-anilin per liter.

In this manner clear, reddish yellow shades of a very good fastness are obtained.

In this manner: ortho-chloroanilin gives a greenish yellow, 5-chloro-1.2-toluidin a reddish lemon yellow, 5-nitro-1.2-toluidin a reddish yellow, ortho-aminoazotoluene a yellowish orange, α-aminoanthraquinone a brownish yellow orange.

The new dyestuffs can also be produced by printing a diazo solution upon a padded fabric according to the usual method, also by using the nitrosamin salts of the corresponding bases.

With other acylacetyl-arylthiazol bodies the process may be conducted similarly.

Now what I claim and desire to secure by Letters Patent, is the following:

1. As new products the azo dyestuffs, insoluble in water, of the type:

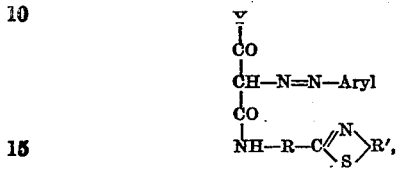

Y meaning a radicle of the hydrocarbon series, R and R' being aromatic residues, which dyestuffs are when dry yellow to orange and brown powders, soluble in sulfuric acid to a yellow to olive solution, which can be used for the production of valuable pigment colors and give, when produced on the fiber, yellow to orange and brown shades of an excellent fastness to washing.

2. A process of making azodyestuffs, insoluble in water, consisting in combining a diazo compound not containing a sulfonic or carboxylic group with an acylacetyl-aminoarylthiazol body of the type:

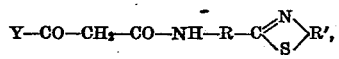

Y meaning a radicle of the hydrocarbon series, R and R' being aromatic residues.

3. Materials, dyed with the new azodyestuffs of claim 1, said azodyestuffs being developed on the fiber of the material.

4. As new products the azodyestuffs, insoluble in water, of the type:

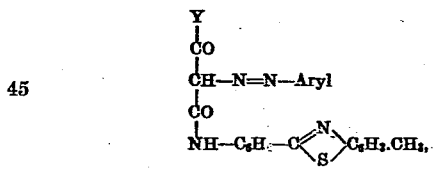

Y meaning a radicle of the hydrocarbon series, which dyestuffs are when dry yellow to orange and brown powders, soluble in sulfuric acid to a yellow to olive solution, which can be used for the production of valuable pigment colors and give, when produced on the fiber, yellow to orange and brown shades of an excellent fastness to washing.

5. A process of making azodyestuffs, insoluble in water, consisting in combining a diazo compound not containing a sulfonic or carboxylic group with an acylacetyldehydrothiotoluidid.

6. Materials, dyed with the new azodyestuffs of claim 4, said azodyestuffs being developed on the fiber of the material.

7. As new products the azodyestuffs, insoluble in water, of the type:

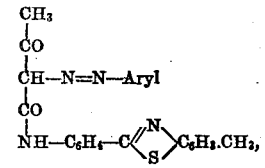

which dyestuffs are when dry yellow to orange and brown powders, soluble in sulfuric acid to a yellow to olive solution, which can be used for the production of valuable pigment colors and give, when produced on the fiber, yellow to orange and brown shades of an excellent fastness to washing.

8. A process of making azodyestuffs, insoluble in water, consisting in combining a diazo compound not containing a sulfonic or carboxylic group with acetoacetyldehydrothiotoluidid.

9. Materials, dyed with the new azodyestuffs of claim 7, said azodyestuffs being developed on the fiber of the material.

10. As new product the azodyestuff, insoluble in water, of the type:

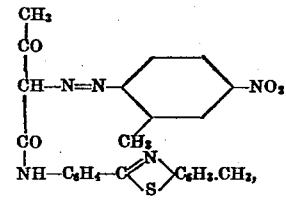

which dyestuff is, when dry an orange powder, soluble in sulfuric acid to a yellow solution, which can be used for the production of valuable pigment colors and gives, when produced on the fiber, reddish yellow shades of an excellent fastness to washing.

11. A process of making an azodyestuff, insoluble in water, consisting in combining the diazo compound of 5-nitro-1.2-toluidin with acetoacetyldehydrothiotoluidid.

12. Materials, dyed with the new azodyestuff of claim 10, said azodyestuff being developed on the fiber of the material.

In testimony, that I claim the foregoing as my invention, I have signed my name, this 28th day of March 1923.

ARTHUR ZITSCHER.

Witnesses:
 GABRIELE FLESCH,
 C. C. L. B. WYLES.